Jan. 25, 1955     W. H. HARLESS     2,700,426
VEHICLE ATTACHED PARKING DEVICE
Filed Jan. 29, 1952     2 Sheets-Sheet 1
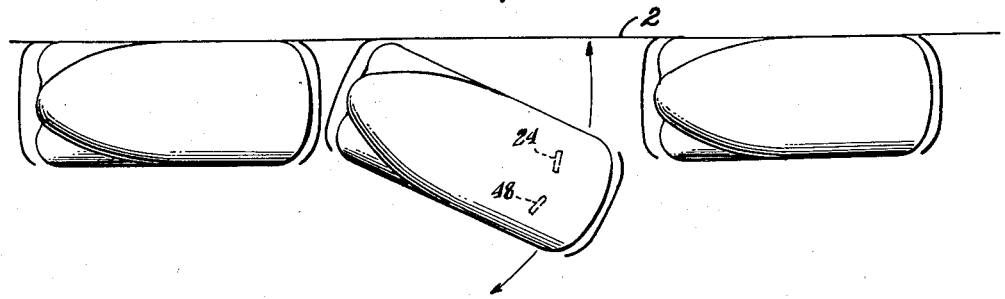
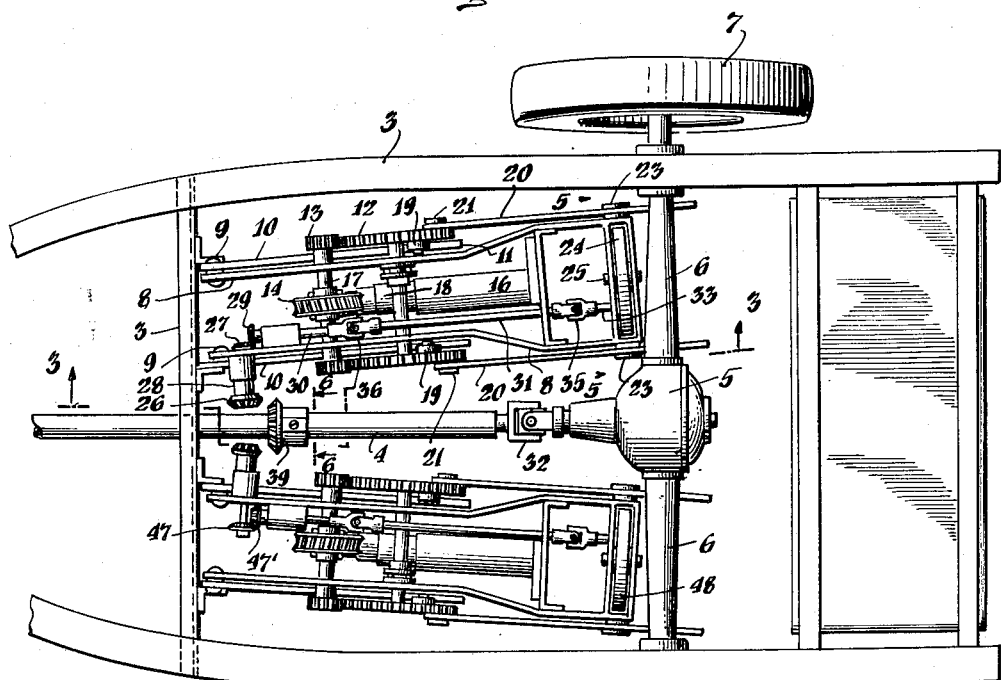
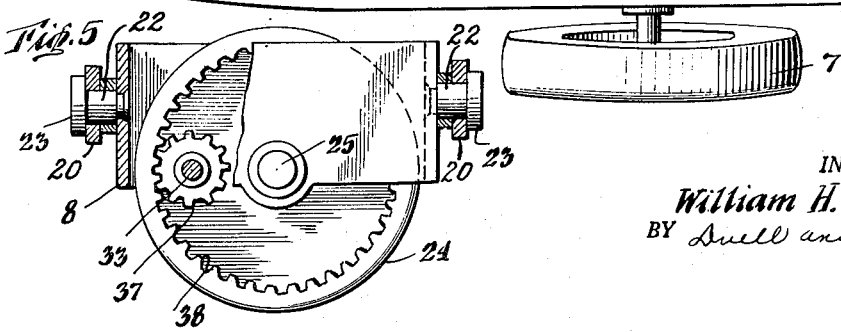
INVENTOR.
William H. Harless
BY Duell and Kane
ATTORNEYS

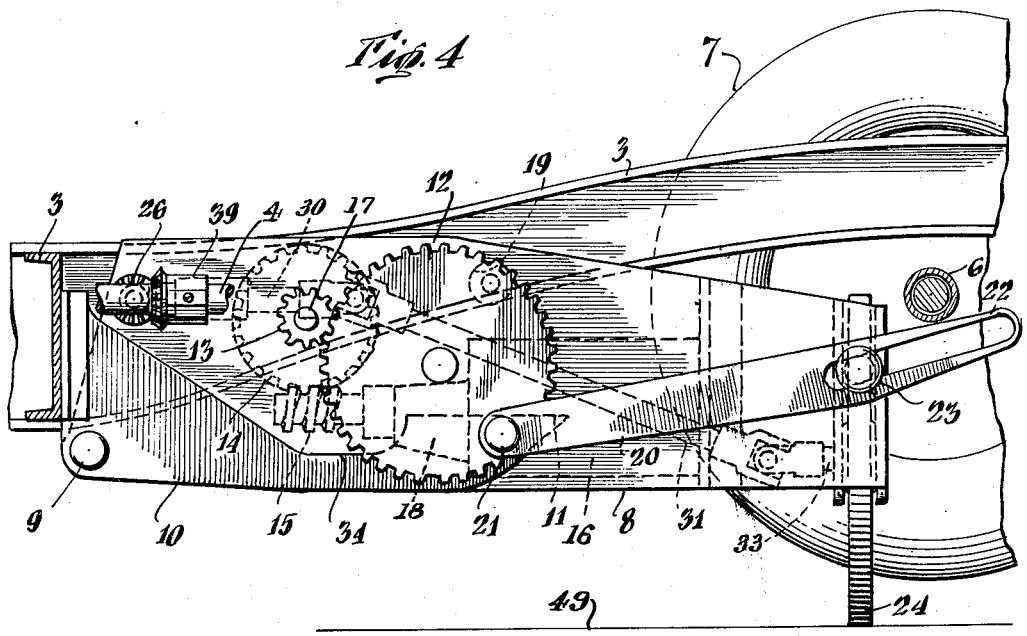
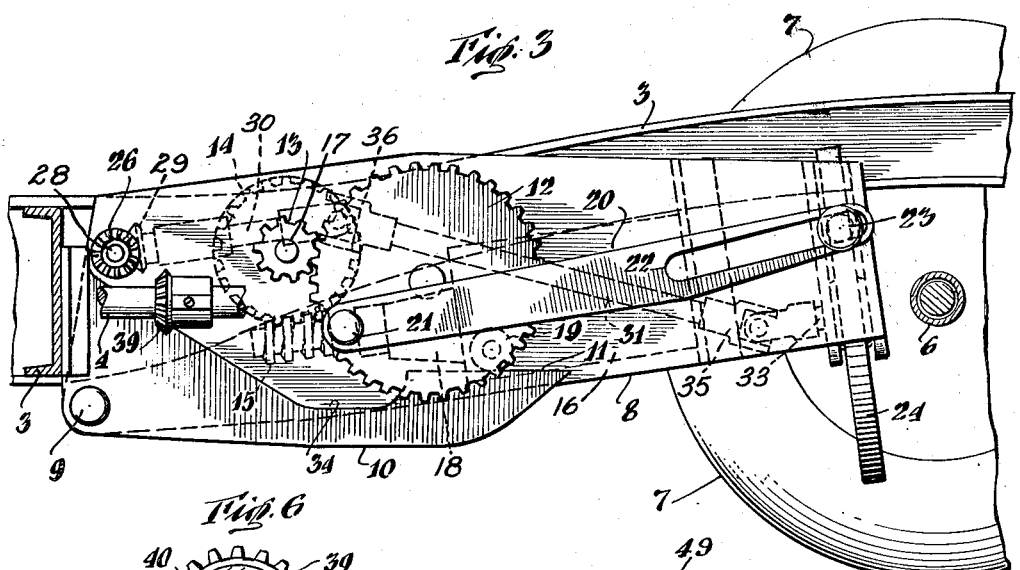
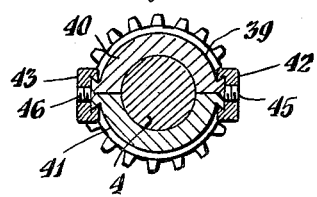
INVENTOR.
William H. Harless
BY Duell and Kane
ATTORNEYS United States Patent Office 2,700,426
Patented Jan. 25, 1955

2,700,426

VEHICLE ATTACHED PARKING DEVICE

William H. Harless, East Moriches, N. Y.

Application January 29, 1952, Serial No. 268,770

2 Claims. (Cl. 180—1)

This invention relates to a device to facilitate the parking of automobiles. More particularly, it relates to a device which will enable the operator of an automobile to park it without having to back into the parking space. The invention provides a means for raising the rear wheels of the automobile off the ground and moving them laterally, thus bringing the rear end of the automobile to the curb after the front end has been nosed in.

This invention also relates to a device which will facilitate the leaving of a crowded parking space by a procedure essentially the reverse of that stated above.

One object of this invention is to produce a device which will enable the inexperienced driver to park an automobile more easily.

Another object of this invention is to provide a device of rugged construction which will raise the rear end of the automobile and move it laterally, and which can be manufactured economically and will be simple to operate.

Another object of this invention is to make a device of this nature which can be easily installed on almost all the conventional makes of automobiles and which will store out of the way beneath the chassis of the automobile.

Another object of this invention is to make a device of this nature which will operate quickly and yet provide the force necessary to raise the rear wheels of an automobile off the ground.

The accompanying drawings serve to assist in the disclosure of the preferred embodiment of this invention. These drawings include:

Fig. 1, a view of a row of automobiles along a curb;

Fig. 2, a plan view showing two of the units installed on a conventional automobile as they would be seen from above when the rear wheels are off the pavement;

Fig. 3, a side elevation of this unit taken along line 3—3 of Figure 2 as mounted on an automobile and in its storage position, i. e., when not in use;

Fig. 4, the same as Figure 3 but showing the position of the elements of this device when the rear wheels have been raised above the pavement;

Fig. 5, a detailed view taken on line 5—5 of Fig. 2; and

Fig. 6, a detailed view taken on line 6—6 of Fig. 2.

Referring now to these drawings in more detail, the structure of this invention is clearly illustrated. Fig. 1 shows an automobile as it would be parked along a curb 2 with the utilization of this device. The automobile is driven forward to the position in the parking space shown in Fig. 1; actuation of the device, as will be described hereinafter, will raise the rear end of the automobile from the pavement and move it laterally and arcuately to a position adjacent to the curb, thus parking the automobile. The reverse procedure would, of course, be followed to remove the automobile from a small parking space.

Fig. 2 shows two of the units mounted beneath the automobile, one on each side of the drive-shaft 4, as is the preferred structure. Since the two units are essentially identical, though mirror images, a description of but one will suffice here.

As depicted in the drawings, the number 3 generally represents the underframe of the automobile, with the drive-shaft 4 connected to the differential 5 through the customary universal joint 32. The rear axle passes to the rear wheels 7, through the rear housing 6. Arms 8, preferably made of steel, as are all parts of this structure, are located at each side of the unit and are pivotally secured to the bar 10 at point 9. The bar 10 is welded or otherwise fixedly secured to the underframe 3, and has a substantially horizontally surface 11 and a cavity 34.

Rotatably mounted on the outside of arms 8 are two gears 12. These gears are operably connected with the electric motor 16 through gears 13, 14, and 15 and shafts 17 and 18. The motor 16 is mounted between the two arms 8.

On the inner side of gears 12 are pins 19. These pins rest upon surface 11 of bar 10 when the unit is in its normal stored position above the pavement. The co-action between pins 19 and surface 11 serves to hold the entire unit mounted on arms 8 above the pavement.

Cranks 20 are pivotally connected to gears 12 by pins 21; they are preferably on the opposite side of gears 12 from pins 19. At the opposite ends of the cranks 20 from their pivotal connections to gears 12 are longitudinal slots 22. Guide pins 23 passing through the slots 22 are fixedly mounted on arms 8.

Wheel 24 is mounted on axle 25 which is rotatably secured between the arms 8 as will be seen in Fig. 2. The axle 25 is substantially parallel to the drive shaft when the unit is in its normal stored position except that it inclines slightly inwardly as shown in Fig. 2. Bevel gears 26 and 27, with shaft 28 are rotatably mounted on arm 8 as shown in Fig. 2. Wheel 24 is operably connected to gear 27 through gears 29, 37 and 38, rods 30, 31 and 33, and universal joints 35 and 36. As is shown in Fig. 5, rod 33 terminates in gear 37, and gear 37 meshes with inside gear 38 secured to wheel 24.

A split bevel gear 39, with halves 40 and 41, fits about the drive-shaft 4 (the drive-shaft housing is not depicted herein). It is held in frictional arrangement with the drive-shaft by retainers 42 and 43 and tensioning screws 45 and 46. Gear 39 is so positioned on drive-shaft as to be out of contact with gear 26 when the unit is in its normal stored position, depicted in Fig. 3, and as to mesh with gear 26 when the unit is in its lowered operative position, as depicted in Fig. 4. The meshing occurs because, as hereinbefore stated, gear 26 is mounted on arm 8 which itself is pivotally mounted.

The lower unit depicted in Fig. 2 is dissimilar from the upper inasmuch as the gear 47, the equivalent of gear 27, is located on the opposite side of the gear 47' with which it meshes. This is necessary in order that the two pavement wheels 24 and 48 will rotate in the same direction.

It will be understood that the above is the preferred embodiment of this invention and that changes may be made in the structure without departing from the spirit of this invention. Illustrative of this would be the fact that either one or two units may be used on an automobile and that each unit does not necessarily require a dual set of cranks 20 and gears 12 together with their associated parts.

The operation of this device is as follows:

Beginning at the normal stored position as depicted in Fig. 3, the electric motor 16 is first actuated in any of the customary manners. The direction of rotation of the motor and the gearing is such that clock-wise rotation of gears 12, as viewed in Fig. 3, results. After a rotation of approximately one-sixth of a full revolution, pins 19 reach the left end of surfaces 11, as viewed in Fig. 3, and drops into cavities 34. Since pins 19, resting on surfaces 11, served to support all of the structures mounted on arms 8, these arms and this structure will drop about pivot 9 when pins 19 fall from surfaces 11.

The downward motion of arms 8 and the structure therein is arrested when wheel 24 touches the pavement 49. This will occur as pins 21 on gears 12 approach their uppermost position in the rotation of gears 12. Inasmuch as arms 8 have dropped, the level of the cranks 20 at the ends containing the slots 22 will be below the level of the rear axle housing 6. Pins 21 will also at the same point be slightly to the right of their initial positions. Accordingly, further rotation of gears 12, will serve to extend cranks 20 to the right and underneath the rear axle housing 6.

Continued clockwise rotation of gears 12, still actuated by the motor 16, will cause pins 21 to approach the position depicted in Fig. 4. This will cause the opposite ends of cranks 20, containing slots 22, to move upward, pivoting about guide pins 23. This motion will result in a force being exerted between the rear axle housing 6 and wheel 24 causing the rear wheels 7 to be lifted from the pavement 49. Wheel 24 will then support the weight of the rear end of the automobile. At this point, operation of the motor 16 is stopped.

As will be seen, the above half-cycle of operation has two separate phases. The first of these is where the unit including the wheel 24 is dropped rapidly to the pavement. In this phase the necessary force is provided by gravity and occurs rapidly. In the second phase the jacking action takes place and a force sufficient to raise the automobile needs to be, and is exerted. It will be seen that the mechanical advantage obtained through the use of the cranks 20 pivoted at guide pins 23 together with the system of gears provided between the cranks 20 and the motor 16 is favorable.

With the rear end of the automobile jacked up and supported by wheel 24, the wheel 24 is operably connected with the drive shaft 4 since the lowering of arm 8 has caused gears 26 and 39 to mesh. Rotation of the drive-shaft causes a comparable rotation of the wheels 24. Thus rotation of the drive-shaft which would cause forward motion of the automobile if the rear wheels were on the ground will now cause lateral motion either to the right or to the left through wheels 24, the direction depending upon the particular gearing arrangement used in the design of the automobile itself. Rotation of the drive-shaft in the opposite direction will cause lateral motion of the automobile in the opposite direction. Once the automobile has been raised from the pavement as above described, it will only be necessary for the operator to shift gears and actuate the automobile so as to drive the rear end of the automobile either to the right or to the left. Since the rear wheels are off the pavement no forward or reverse motion will be imparted to the automobile, even though the wheels do rotate.

After the automobile is properly parked, the electric motor 16 is once again actuated in the same direction as previously. This will again cause the gears 12 to rotate clockwise. At the beginning of this motion, gears 12 and the associated parts will be in the position as depicted in Fig. 4. This rotation of gears 12 will move the pins 21 and the associated cranks 20 to the left as viewed in Fig. 4. It will also move pins 21 upward after a very short period of rotation. This movement of cranks 20 to the left will allow the rear axle housing 6 to drop off the rear ends of cranks 20. This will lower the automobile to the pavement. This last rotation has also served to lower pins 19 on gears 12 to a point near surfaces 11. Continued rotation of the gears 12 will cause pins 19 to press upon surfaces 11, thus raising the entire unit carried by arms 8 from the ground to its normal storage position depicted in Fig. 3. Raising this entire unit will also serve to unmesh gears 26 and 39. At this point, the motor 16 is stopped. The automobile may now be operated in the normal manner.

It will be seen that this device may be used either to park an automobile or to remove the car from the parking space. The only changes in the cycle of operation necessary to remove a car from the parking space instead of parking it is to put the car in reverse instead of forward, or vice versa, depending upon the particular gearing arrangement used between the drive-shaft 4 and the wheel 24, while the rear wheels 7 are off the pavement.

The lateral motion of the automobile resulting from the use of this device is facilitated by the slight angle in the positioning of axle 25 relative to the drive-shaft 4, as shown in Fig. 2. This angle enables the automobile more easily to pivot about a point midway between the front wheels on an arc, as shown in Fig. 1.

I claim:

1. In a device of the character described, the combination of a bar to be fixedly secured to the underframe of an automobile, said bar having a fixed surface and terminating in a cavity at one end of said surface, an arm pivotally connected to said bar, a gear wheel rotatably mounted on said arm about an axis parallel to the axis of the pivotal connection between said bar and said arm, a motor mounted on said arm, gears operably connecting said gear wheel and said motor, a pin positioned on the face of said gear wheel nearest the fixed surface and moving with said gear wheel to describe a circular path about said gear wheel axis, the intersection of the adjacent ends of said fixed surface and cavity positioned with respect to said gear wheel radially inside of said path with said adjacent ends intersecting said path, said pin being of sufficient length to rest on said surface when said device is in its normal storage position, whereby rotation of said gear wheel will cause said pin to slide along said surface and drop into said cavity when said pin passes said intersection, whereby said device can drop to operative position.

2. In a device of the character described, the combination of a bar to be fixedly secured to the underframe of an automobile, said bar having a fixed surface and a cavity at one end of said surface, an arm pivotally connected to said bar, a gear wheel rotatably mounted on said arm about an axis parallel to the axis of the pivot connecting said bar and said arm, a motor mounted on said arm, gears operably connecting said gear wheel and said motor, a pin positioned on the face of said gear wheel nearest the said fixed surface, said pin being of sufficient length to rest on said surface when said device is in its normal storage position, a second pin secured to the opposite face of said gear wheel and extending outwardly therefrom in an oppositely disposed direction to that of the first pin and spaced therefrom along a chord of the said gear wheel, a guide pin fixedly secured to the rear portion of said arm, a crank containing a slot, said crank being pivotally connected to said second pin and slidingly connected about said slot to said guide pin, a wheel rotatably mounted on said arm, whereby rotation of said gear wheel will cause vertical force to be exerted between said wheel and the rear end of said crank.

References Cited in the file of this patent

UNITED STATES PATENTS

| | | |
|---|---|---|
| 1,420,307 | Delaney | June 20, 1922 |
| 1,742,566 | Walker | Jan. 7, 1930 |
| 1,815,207 | Moffat | July 21, 1931 |
| 1,884,932 | Walker | Oct. 25, 1932 |
| 2,054,842 | Walker | Sept. 22, 1936 |
| 2,165,461 | Dreisbach | July 11, 1939 |